US012596212B2

(12) United States Patent
Chung et al.

(10) Patent No.: US 12,596,212 B2
(45) Date of Patent: Apr. 7, 2026

(54) DISPLAY DEVICE

(71) Applicant: E Ink Holdings Inc., Hsinchu (TW)

(72) Inventors: Xian-Teng Chung, Hsinchu (TW);
Po-Yuan Lo, Hsinchu (TW); Ian French, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 302 days.

(21) Appl. No.: 18/470,419

(22) Filed: Sep. 20, 2023

(65) Prior Publication Data

US 2024/0219615 A1     Jul. 4, 2024

(30) Foreign Application Priority Data

Dec. 29, 2022     (TW) .................................. 111150559

(51) Int. Cl.
*G02B 5/20*          (2006.01)
(52) U.S. Cl.
CPC .................................... *G02B 5/201* (2013.01)
(58) Field of Classification Search
CPC ......... G02F 1/133514; G02F 1/136222; G02F 2203/055; G02F 2201/52; G02B 5/201
See application file for complete search history.

(56) References Cited

U.S. PATENT DOCUMENTS 4,793,692  A     12/1988  Kamio et al.
6,750,928  B2     6/2004  Hiji et al.
9,477,020  B2    10/2016  Kim et al.

2002/0180687 A1*  12/2002  Webber ................... G02F 1/167
                                                       345/107
2009/0141221 A1*   6/2009  Taguchi ............ G02F 1/133514
                                                       349/109
2011/0001909 A1*   1/2011  Tseng ................ G02F 1/136209
                                                       349/106
2012/0257269 A1*  10/2012  Paolini, Jr. ........ G02F 1/133514
                                                       359/296
2013/0003207 A1*   1/2013  Wang ................ G02F 1/133514
                                                       359/891
2018/0088429 A1*   3/2018  Gu .......................... G02F 1/157
                                    (Continued)

FOREIGN PATENT DOCUMENTS

CN         105954907 A      9/2016
CN         110515250 A     11/2019
                    (Continued)

OTHER PUBLICATIONS

The office action of corresponding TW application No. 111150559 issued on Sep. 28, 2023.

*Primary Examiner* — Jonathan Y Jung
(74) *Attorney, Agent, or Firm* — CKC & Partners Co., LLC

(57)          ABSTRACT

A display device which includes a display panel having a display surface, a transparent layer over the display panel and a color filter array over the transparent layer is provided. The color filter array includes yellow color filter elements, blue color filter elements and primary color filter elements. The yellow color filter elements project first regions on the display surface; the blue color filter elements project second regions on the display surface; and the primary color filter elements project third regions on the display surface. Each of the first regions is connected to at least one of the third regions, while each of the first regions is separated from any one of the second regions.

17 Claims, 4 Drawing Sheets

(56) References Cited

U.S. PATENT DOCUMENTS

| 2021/0359018 A1 * | 11/2021 | Koshihara | H10K 59/878 |
| 2022/0019003 A1 * | 1/2022 | Ahn | G02F 1/133514 |
| 2023/0194761 A1 * | 6/2023 | Liao | G02F 1/1677 |
| | | | 359/891 |

FOREIGN PATENT DOCUMENTS

| CN | 111381397 A | 7/2020 |
| TW | 201403142 A | 1/2014 |

\* cited by examiner

DISPLAY DEVICE

RELATED APPLICATION

This application claims priority to Taiwan Application Serial Number 111150559, filed Dec. 29, 2022, which is herein incorporated by reference.

BACKGROUND

Field of Invention

The present invention relates to a display device. More particularly, the present invention relates to the display device with improved color performance.

Description of Related Art

The present electrophoretic display (EPD) filters the light reflected by a display medium layer with a color filter array made by printing to form the corresponding images. The color filter array is generally formed on a piece of glass and includes color filter elements with three colors, which are red, green and blue filter elements. The color filter elements with such three colors can be used for the electrophoretic display to display color images.

SUMMARY

An aspect of the present invention provides a display device, and the display device achieves better color performance by increasing yellow color filter elements.

According to the aspect of the present invention, providing a display device. The display device includes a display panel having a display surface; a transparent layer located on the display surface; and a color filter array located on the transparent layer, and includes a plurality of yellow color filter elements projected a plurality of first regions on the display surface; a plurality of blue color filter elements projected a plurality of second regions on the display surface; and a plurality of primary color filter elements projected a plurality of third regions on the display surface, in which each of the first regions is separated from any one of the second regions.

According to an embodiment of the present invention, each of the first regions is connected to at least one of the third regions.

According to an embodiment of the present invention, the display panel further includes a plurality of sub-pixel regions, and includes an element array substrate including a plurality of control elements; and a display medium layer located between the element array substrate and the color filter array, in which the control elements are configured to respectively control a grey level of the display medium in the sub-pixel regions.

According to an embodiment of the present invention, each of the second regions and the third regions is located in one of the sub-pixel regions, and at least one of the first regions is located at a boundary between adjacent two of the sub-pixel regions.

According to an embodiment of the present invention, each of the yellow color filter elements is not adjacent to each of the blue color filter elements when the yellow color filter elements and the blue color filter elements are both disposed on the same surface of the transparent layer.

According to an embodiment of the present invention, the primary color filter elements includes a plurality of red color filter elements and a plurality of green color filter elements, in which the yellow color filter elements are adjacent to the red color filter elements and/or the green color filter elements when the yellow color filter elements and the primary color filter elements are disposed on the same surface of the transparent layer.

According to an embodiment of the present invention, any of the yellow color filter elements, the blue color filter elements, the red color filter elements and the green color filter elements having the same color are not adjacent.

According to an embodiment of the present invention, the color filter array includes an insulating layer disposed on the transparent layer and having a first side and a second side on the opposite, in which the yellow color filter elements are located on the first side, and the blue color filter elements are located on the second side.

According to an embodiment of the present invention, the yellow color filter elements are located between the insulating layer and the transparent layer.

According to an embodiment of the present invention, an area of each of the first regions is different from an area of each of the second regions.

According to an embodiment of the present invention, a shape of each of the first regions is different from the shapes of the second regions.

According to an embodiment of the present invention, the display device is a color electronic paper display device.

According to another aspect of the present invention, providing a display device. The display device includes a display panel having a display surface and a plurality of sub-pixel regions; a transparent layer located on the display surface; and a color filter array located on the transparent layer. The color filter array includes a plurality of yellow color filter elements aligned to a boundary between adjacent two of the sub-pixel regions, in which projection of the yellow color filter elements on the display surface occupies a first region; a plurality of blue color filter elements aligned to one of the sub-pixel regions, in which projection of the blue color filter elements on the display surface occupies a second region; and a plurality of primary color filter elements aligned to another one of the sub-pixel regions, wherein projection of the primary color filter elements on the display surface occupies a third region, and each of the first regions is connected to at least one of the third regions.

According to an embodiment of the present invention, each of the first regions is separated from any one of the second regions.

According to an embodiment of the present invention, the display panel further includes an element array substrate comprising a plurality of control elements; and a display medium layer located between the element array substrate and the color filter array, in which the control elements are configured to respectively control a grey level of the display medium in the sub-pixel regions.

According to an embodiment of the present invention, the primary color filter elements includes a plurality of red color filter elements and a plurality of green color filter elements, in which the yellow color filter elements are adjacent to the red color filter elements and/or the green color filter elements when the yellow color filter elements and the primary color filter elements are disposed on the same surface of the transparent layer.

According to an embodiment of the present invention, each of the yellow color filter elements is not adjacent to each of the blue color filter elements when the yellow color filter elements and the blue color filter elements are both disposed on the same surface of the transparent layer.

According to an embodiment of the present invention, the color filter array includes an insulating layer disposed on the transparent layer and having a first side and a second side on the opposite, wherein the yellow color filter elements are located at the first side, and the blue color filter elements are located at the second side.

According to an embodiment of the present invention, an area of each of the first regions is different from an area of each of the second regions.

According to an embodiment of the present invention, a shape of each of the first regions is different from a shape of each of the second regions.

Application of the display device of the present disclosure, the first regions projected on the display surface by the yellow color filter elements within the color filter array are separated from the second regions projected by the blue color filter elements, but connected to the third regions projected by the primary color filter elements. Therefore, color performance of the display device can be increased, and white balance is improved.

It is to be understood that both the foregoing general description and the following detailed description are by examples, and are intended to provide further explanation of the invention as claimed.

BRIEF DESCRIPTION OF THE DRAWINGS

Aspects of the present disclosure are best understood from the following detailed description when read with the accompanying figures. It is noted that, in accordance with common practice in the industry, various features are not drawn to scale. In fact, the dimensions of the various features may be arbitrarily increased or reduced for clarity of discussion.

DETAILED DESCRIPTION

Figure 1:
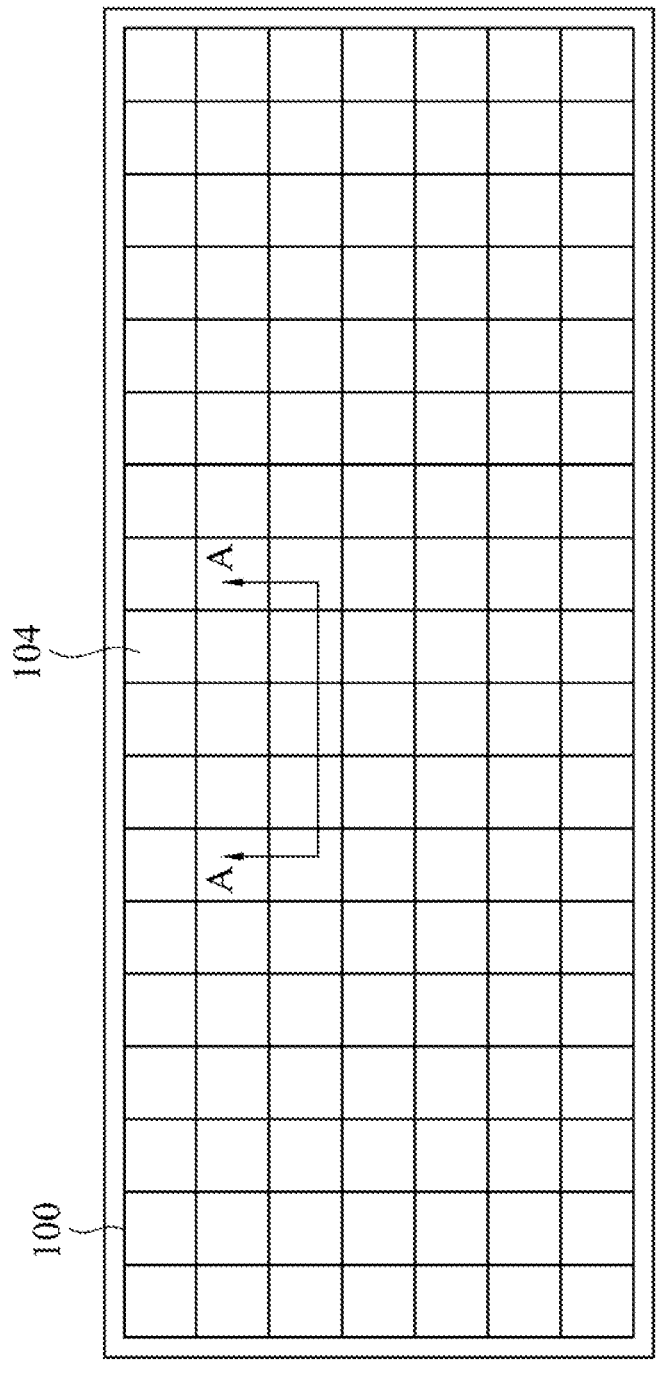
FIG. 1 illustrates a top view of a display device according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s)

as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Numerical quantities given herein are approximate, meaning that the term "around," "about," "approximately," or "substantially" can be inferred if not expressly stated.

A display device is provided in the present disclosure. The first regions projected on the display surface by the yellow color filter elements within the color filter array are separated from the second regions projected by the blue color filter elements, but connected to the third regions projected by the primary color filter elements. Therefore, color performance of the display device can be increased, and white balance is improved.

Figure 2:
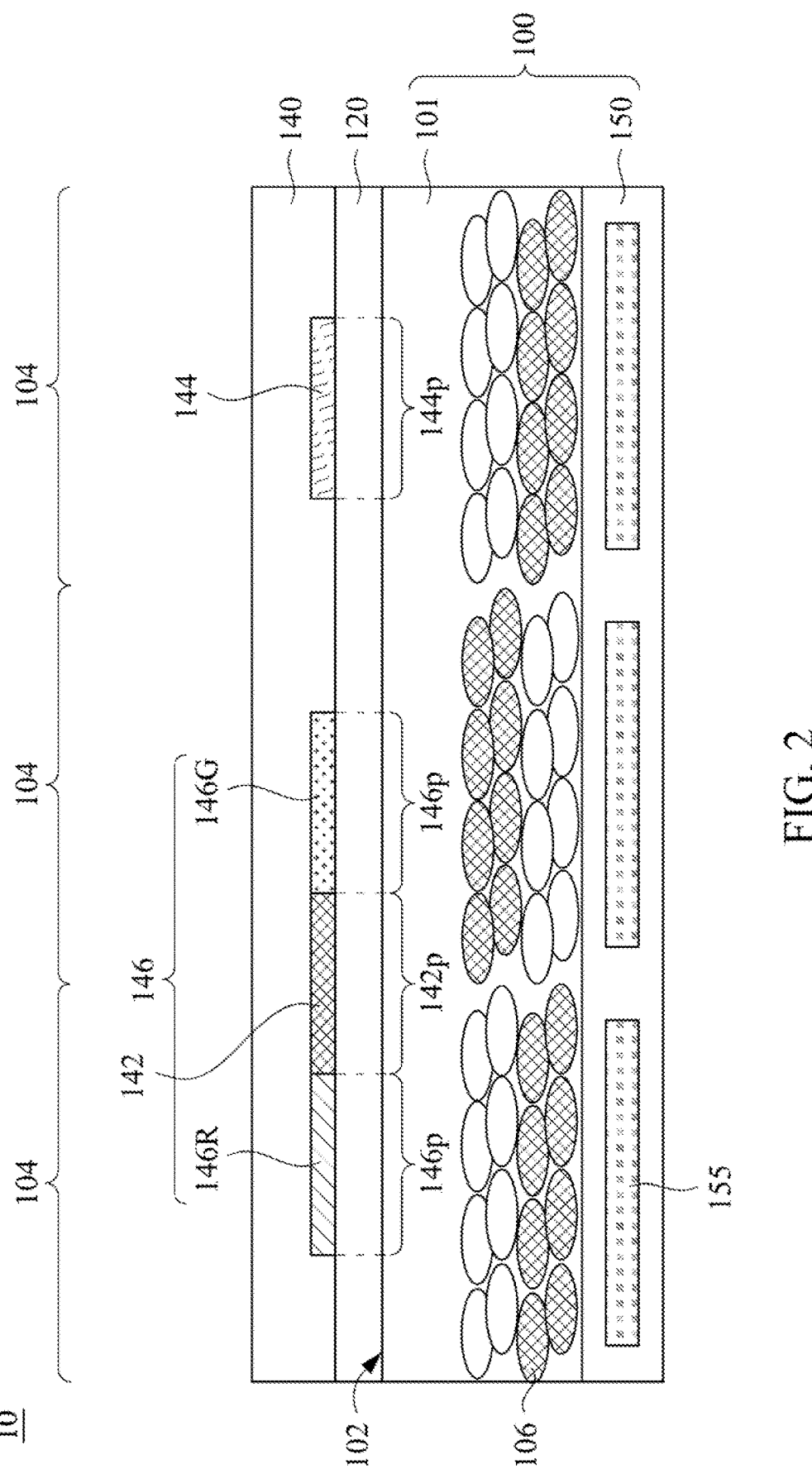
FIG. 2 illustrates a cross-sectional view along line A-A of the display device in FIG. 1.

Referring to FIG. 1 and FIG. 2, in which FIG. 1 illustrates a top view of a display device according to some embodiments of the present disclosure, while FIG. 2 illustrates a cross-sectional view along line A-A of the display device in FIG. 1. The display device 10 includes a display panel 100, a transparent layer 120 and a color filter array 140. The display panel 100 includes a display surface 102. The transparent layer 120 is located on the display surface 102, while the color filter array 140 is located on the transparent layer 120.

In some embodiments, the display panel 100 further includes sub-pixel regions 104 located in the display surface 102, and the display panel 100 includes an element array substrate 150 and a display medium layer 101 sub-pixel regions 104 located in the display surface 102, and the display panel 100 includes an element array substrate 150 and a display medium layer 101, that is, the display medium layer 101 is located between the element array substrate 150 and color filter array 140. The element array substrate 150 has plural of control elements 155 to control the grey level of the display medium layer 101 in the sub-pixel regions 104, respectively. In some embodiments, as shown in FIG. 2, the display medium layer 101 has plural of microcapsule 106, and the display device 10 is a color electrophoretic display device.

As shown in FIG. 2, the transparent layer 120 is located between the display panel 100 and the color filter array 140. In some embodiments, the transparent layer 120 includes a transparent conductive, semiconductor or dielectric material, such as indium tin oxide (ITO), aluminum tin oxide (ATO), aluminum zinc oxide (AZO), indium germanium zinc oxide (IGZO), zinc oxide (ZnO), Zirconium Dioxide (ZrO$_2$), other suitable material or combination thereof. In some embodiments, the transparent layer 120 further includes a bonding material (not shown) having adhesiveness, such as conductive polymer material, thereby adhering the transparent layer 120 onto the display panel 100.

In some embodiments, as shown in FIG. 2, color filter array 140 includes yellow color filter element 142, a blue color filter element 144, and other primary color filter elements (for example, a red color filter element 146R and a green color filter element 146G). In some embodiments, the yellow color filter element 142 may have a pixel fill factor (PFF) of about 20% to about 30%.

The yellow color filter element 142 projects a first region 142$p$ on the display surface 102, the blue color filter element 144 projects a second region 144$p$ on the display surface 102, and the red color filter element 146R and the green color filter element 146G project a third region 146$p$ on the display surface 102. As shown in FIG. 2, the first region 142*p* is connected to the third region 146*p*, and the first region 142*p* is separated from the second region 144*p*.

Therefore, when the yellow color filter element 142 and the blue color filter element 144 are located on the same surface of the transparent layer 120, the yellow color filter element 142 is not adjacent to the blue color filter element 144; when the yellow color filter element 142 and the primary color filter element 146 are located on the same surface of the transparent layer 120, the yellow color filter element 142 is adjacent to the red color filter element 146R and/or green color filter element 146G, for example, the yellow color filter element 142 is located between the red color filter element 146R and the green color filter element 146G.

Figure 3:
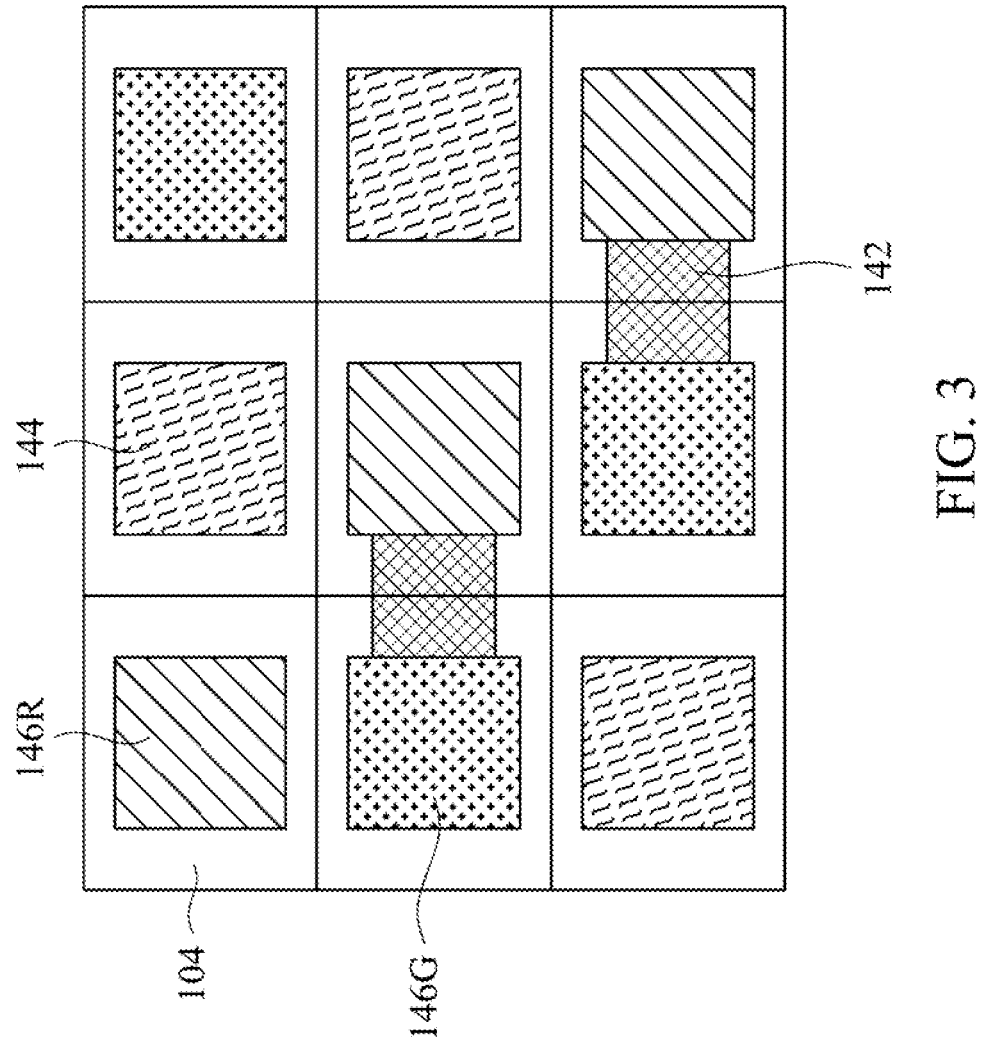
FIG. 3 illustrates a top view of part of the color filter array of the display device in FIG. 1.

Referring to FIG. 3, which illustrates a top view of part of the color filter array 140 of the display device 10 of FIG. 1 and FIG. 2. FIG. 3 illustrates nine sub-pixel regions 104, in which each of the blue color filter elements 144, the red color filter elements 146R and the green color filter elements 146G is located in a sub-pixel region 104, and the yellow color filter elements 142 is located at a boundary between adjacent two of the sub-pixel regions 104. Thereby, the yellow color filter element 142 is not completely disposed in a single sub-pixel region 104. Moreover, the color filter elements with the same color cannot be adjacent to each other, that is, the adjacent color filter elements can be the color filter elements with different colors. As described above, the yellow color filter elements 142 are adjacent to the red color filter elements 146R and the green color filter elements 146G, and the yellow color filter elements 142 are not adjacent to any one of the blue color filter elements 144.

The yellow color filter elements 142 are located at the boundary between adjacent two of the sub-pixel regions 104 and are not disposed in a single sub-pixel region 104, while each control element 155 control grey level of the display medium layer 101 in the single sub-pixel region; thus, each of the blue color filter elements 144, the red color filter elements 146R and the green color filter elements 146G is controlled by an exclusive control element 155, but the yellow color filter element 142 cannot be controlled by the exclusive control elements 155. Therefore, these control elements 155 can control grey level of blue color, grey level of red color and grey level of green color produced by the blue color filter elements 144, the red color filter elements 146R and the green color filter elements 146G, respectively, but cannot directly control grey level of yellow color produced by the yellow color filter elements 142.

It is understood that although the blue color filter elements 144, the red color filter elements 146R and the green color filter elements 146G are illustrated to be having the same dimension and the same shape in FIG. 3, the yellow color filter elements 142 are illustrated to be having smaller dimension, the present disclosure is not limited to it. Therefore, the areas and the shapes of the first regions 142*p*, the second regions 144*p* and the third regions 146*p* can be the same or different.

Figure 4:
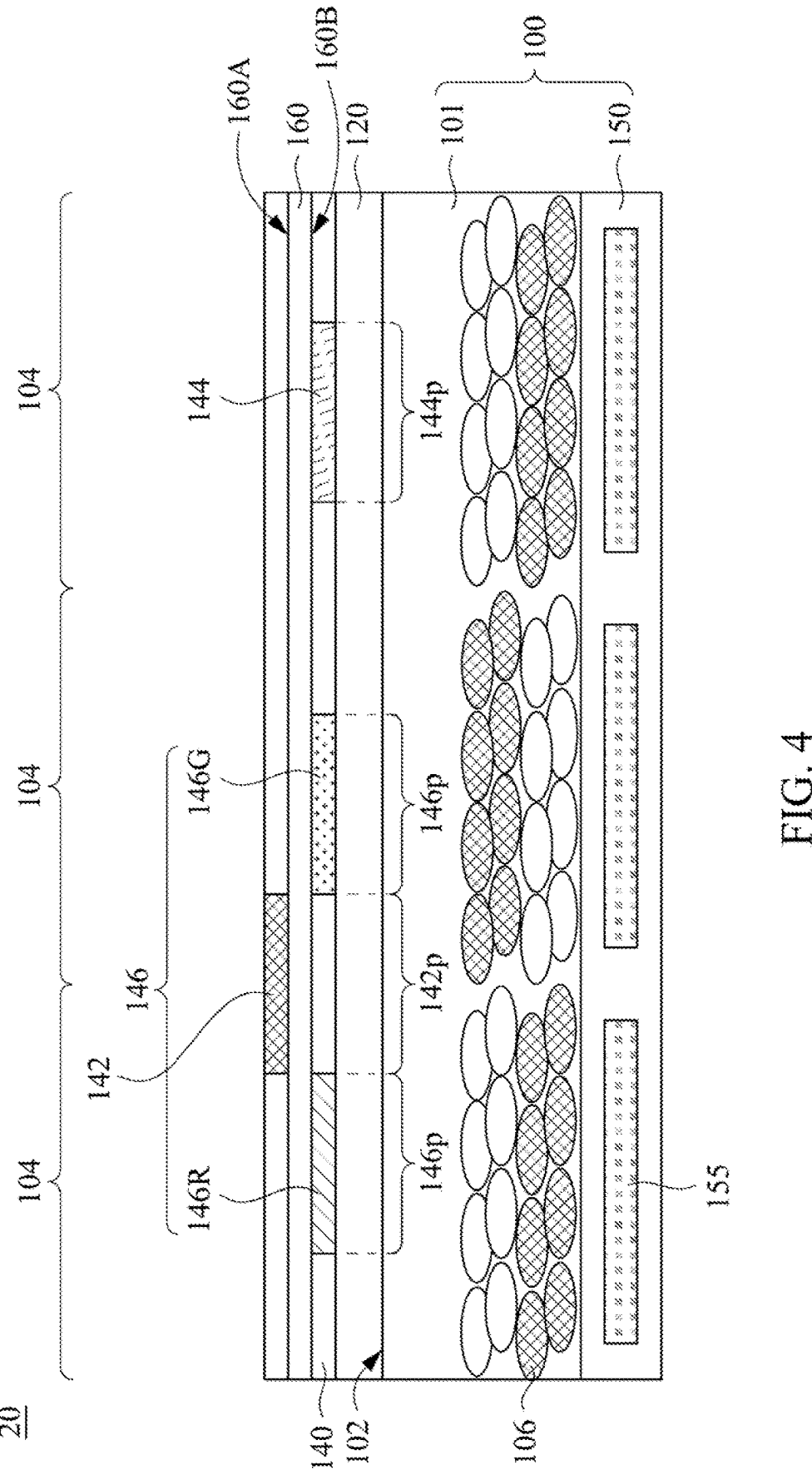
FIG. 4 illustrates a cross-sectional view of a display device according to other embodiments of the present disclosure.

Referring to FIG. 4, which illustrates a cross-sectional view of a display device 20 according to other embodiments of the present disclosure. The display device 20 has similar configuration as the display device 10, that is, the display device 10 and the display device 20 are reflective display device, such as a color electronic paper display device, and the display device 20 includes a display panel 100, a transparent layer 120 and a color filter array 140.

The display panel 100 includes a display surface 102. The transparent layer 120 is located on the display surface 102.

In some embodiments, the display panel 100 further includes sub-pixel regions 104 located in the display surface 102, and the display panel 100 includes an element array substrate 150 and a display medium layer 101 on the element array substrate 150. The element array substrate 150 has plural of control elements 155 to control grey level of the display medium layer 101 in the sub-pixel regions 104, respectively.

The difference between the display device 20 and the display device 10 is that the color filter array 140 of the display device 20 includes an insulating layer 160, and the yellow color filter elements 142 and the blue color filter elements 144 are at opposite sides of the insulating layer 160, respectively. In other words, as shown in FIG. 4, the insulating layer has a first side 160A and a second side 160B on the opposite, and the yellow color filter elements are on the first side 160A, while the blue color filter elements 144 are on the second side 160B; thus, the blue color filter elements 144 are located between the insulating layer 160 and the transparent layer 120. In some embodiments, the primary color filter elements 146 are on the second side 160B. In other embodiments, the yellow color filter elements 142 are on the second side 160B, while the blue color filter elements (and the primary color filter elements 146) are on the first side 160A, that is, the yellow color filter elements 142 are located between the transparent layer 120 and the insulating layer 160.

In the color filter array 140 of the display device 20, the yellow color filter elements 142 and other color filter elements are disposed on different sides of the insulating layer 160, thereby allowing the yellow color filter elements 142 and other color filter elements are not on the same surface, but distribution of projection of the yellow color filter elements 142, the blue color filter elements 144 and the primary color filter elements 146 (i.e. the red color filter elements 146R and the green color filter elements 146G) on the display surface 102 is still similar to the display device 10. That is, the first region 142*p* and the third region 146*p* are adjacent or connected to each other, while the first region 142*p* and the second region 144*p* are separated from each other.

As described above, the present disclosure provides a display device. The yellow color filter elements are added on the specific position, and the first region projected on the display surface by the yellow color filter element is separated from the second region projected by the blue color filter element, but are connected to the third region projected by the other primary color filter element. Therefore, color performance of the display device is improved, and excellent white balance can be maintained.

Although the present disclosure has been described in considerable detail with reference to certain embodiments thereof, the present disclosure is not limited to it. It will be apparent to those skilled in the art that various modifications and variations can be made to the structure of the present disclosure without departing from the scope or spirit of the disclosure. In view of the foregoing, it is intended that the present disclosure cover modifications and variations of this invention provided they fall within the scope of the following claims.

What is claimed is:

1. A display device, comprising:
   a display panel having a display surface;
   a transparent layer located on the display surface; and
   a color filter array located on the transparent layer, and
      comprising:

a plurality of yellow color filter elements projected a plurality of first regions on the display surface;

a plurality of blue color filter elements projected a plurality of second regions on the display surface; and a plurality of primary color filter elements projected a plurality of third regions on the display surface, wherein each of the first regions is separated from any one of the second regions;

wherein the display panel further comprises a plurality of sub-pixel regions, and comprises:

an element array substrate comprising a plurality of control elements; and a display medium layer located between the element array substrate and the color filter array, wherein the control elements are configured to respectively control a gray level of the display medium layer in the sub-pixel regions, wherein each of the first regions vertically overlaps adjacent two of the control elements.

2. The display device of claim 1, wherein each of the first regions is connected to at least one of the third regions.

3. The display device of claim 1, wherein each of the second regions and the third regions is located in one of the sub-pixel regions, and at least one of the first regions is located at a boundary between adjacent two of the sub-pixel regions.

4. The display device of claim 1, wherein each of the yellow color filter elements is not adjacent to each of the blue color filter elements when the yellow color filter elements and the blue color filter elements are both disposed on the same surface of the transparent layer.

5. The display device of claim 4, wherein the primary color filter elements comprise:

a plurality of red color filter elements and a plurality of green color filter elements, wherein the yellow color filter elements are adjacent to the red color filter elements and/or the green color filter elements when the yellow color filter elements and the primary color filter elements are disposed on the same surface of the transparent layer.

6. The display device of claim 5, wherein any of the yellow color filter elements, the blue color filter elements, the red color filter elements and the green color filter elements having the same color are not adjacent.

7. The display device of claim 1, wherein the color filter array comprises:

an insulating layer disposed on the transparent layer and having a first side and a second side on the opposite, wherein the yellow color filter elements are located on the first side, and the blue color filter elements are located on the second side.

8. The display device of claim 1, wherein an area of each of the first regions is different from an area of each of the second regions.

9. The display device of claim 1, wherein a shape of each of the first regions is different from a shape of each of the second regions.

10. The display device of claim 1, wherein the display device is a color electronic paper display device.

11. A display device, comprising:

a display panel having a display surface and a plurality of sub-pixel regions;

a transparent layer located on the display surface; and a color filter array located on the transparent layer, and comprising:

a plurality of yellow color filter elements aligned to a boundary between adjacent two of the sub-pixel regions, wherein projection of the yellow color filter elements on the display surface occupies a plurality of first regions;

a plurality of blue color filter elements aligned to one of the sub-pixel regions, wherein projection of the blue color filter elements on the display surface occupies a plurality of second regions; and a plurality of primary color filter elements aligned to another one of the sub-pixel regions, wherein projection of the primary color filter elements on the display surface occupies a plurality of third regions, and each of the first regions is connected to at least one of the third regions;

wherein the display panel further comprises:

an element array substrate comprising a plurality of control elements; and a display medium layer located between the element array substrate and the color filter array, wherein the control elements are configured to respectively control a gray level of the display medium layer in the sub-pixel regions;

wherein each of the first regions vertically overlaps adjacent two of the control elements.

12. The display device of claim 11, wherein each of the first regions is separated from any one of the second regions.

13. The display device of claim 11, wherein the primary color filter elements comprise:

a plurality of red color filter elements and a plurality of green color filter elements, wherein the yellow color filter elements are adjacent to the red color filter elements and/or the green color filter elements when the yellow color filter elements and the primary color filter elements are disposed on the same surface of the transparent layer.

14. The display device of claim 11, wherein each of the yellow color filter elements is not adjacent to each of the blue color filter elements when the yellow color filter elements and the blue color filter elements are both disposed on the same surface of the transparent layer.

15. The display device of claim 11, wherein the color filter array comprises:

an insulating layer disposed on the transparent layer and having a first side and a second side on the opposite, wherein the yellow color filter elements are located at the first side, and the blue color filter elements are located at the second side.

16. The display device of claim 11, wherein an area of each of the first regions is different from an area of each of the second regions.

17. The display device of claim 11, wherein a shape of each of the first regions is different from a shape of each of the second regions.

* * * * *